(12) United States Patent
Weilnau, Jr. et al.

(10) Patent No.: US 8,072,975 B2
(45) Date of Patent: Dec. 6, 2011

(54) HOST DISCOVERY ACROSS DIFFERENT ADDRESS SPACES

(75) Inventors: Wayne R. Weilnau, Jr., Austin, TX (US); Robert L. Winter, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 69 days.

(21) Appl. No.: 12/269,444

(22) Filed: Nov. 12, 2008

(65) Prior Publication Data

US 2010/0118734 A1    May 13, 2010

(51) Int. Cl.
*H04L 12/28* (2006.01)
(52) U.S. Cl. ........ 370/389; 370/252; 370/254; 370/400; 370/401; 709/223; 709/245
(58) Field of Classification Search .......... 370/252, 370/401, 466, 400, 331; 709/223, 245, 227; 713/2
See application file for complete search history.

(56) References Cited

U.S. PATENT DOCUMENTS

| | | | |
|---|---|---|---|
| 2004/0165602 A1* | 8/2004 | Park et al. | 370/401 |
| 2006/0106943 A1* | 5/2006 | Akisada et al. | 709/245 |
| 2006/0120297 A1* | 6/2006 | Hamedi et al. | 370/252 |
| 2006/0259608 A1* | 11/2006 | Kim et al. | 709/223 |
| 2007/0025366 A1* | 2/2007 | Shahrier et al. | 370/400 |
| 2008/0229089 A1* | 9/2008 | Assouad et al. | 713/2 |

OTHER PUBLICATIONS

ICMP Type 8, Echo Request Message; http://www.networksorcery.com/enp/protocol/icmp/msg8.html; downloaded Oct. 25, 2008 at 8:54 AM; pp. 1-3.
Ping; http://en.wikipedia.org/wiki/Ping; downloaded Oct. 25, 2008 at 9:03 AM; pp. 1-5.
Liguori, Ralph; DoD $IPv_A$ Standard Profiles for $IPv_A$ Capable Products, Version 1.0; Jun. 1, 2006; http://jitc.fhu.disa.mil/adv_ip/register/docs/disr_ipv6_product_profile_v1.doc; downloaded Nov. 12, 2008 at 12:15 PM; pp. 1-29.

* cited by examiner

*Primary Examiner* — Dang Ton
*Assistant Examiner* — Mohamed Kamara
(74) *Attorney, Agent, or Firm* — Larson Newman, LLP

(57) ABSTRACT

The "dual stack" capability of a network supporting two or more address spaces is used to perform host discovery in the network address space of one network address format using the network address space of another network format (e.g., via a PING sweep in the network address space of the other network format). The host discovery can be performed using addressing in a smaller network address space (e.g., IPv4 network address format) to discover hosts in a larger network address space (e.g., IPv6 network address format), or vice versa.

22 Claims, 4 Drawing Sheets

HOST DISCOVERY ACROSS DIFFERENT ADDRESS SPACES

FIELD OF THE PRESENT DISCLOSURE

This disclosure relates generally to networked information handling systems, and more particularly to host discovery in networks.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

When implemented as a node within a network, an information handling system typically is assigned a unique network address from the address space of the network protocol implemented in the network. Nodes within the network typically use a host discovery technique, such as a conventional PING sweep, to discover other nodes, or hosts, within the network or subnetwork. While PING sweeps and other conventional host discovery techniques can be efficiently implemented in networks implementing a relatively small network address space, the evolution of network protocols and the growth in the number of networked information handling systems can lead to the implementation of a network address space that is too vast to make conventional host discovery techniques practicable. To illustrate, Internet Protocol version 4 (IPv4) specifies network addresses of 32 bits that can only represent approximately 4.3 billion individual hosts, whereas the newer Internet Protocol version 6 (IPv6) specifies an 128-bit address space in part to permit far more hosts to be uniquely identified on a large network (such as the Internet). While a PING sweep of an IPv4 host assigned field of 8 or 16 bits can be performed in a matter of minutes or hours at present network performance capabilities, the typical IPv6 host address field of 96 bits or more would take millennia to completely sweep. Accordingly, an improved technique for host discovery in a network utilizing a relatively large network address space would be advantageous.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
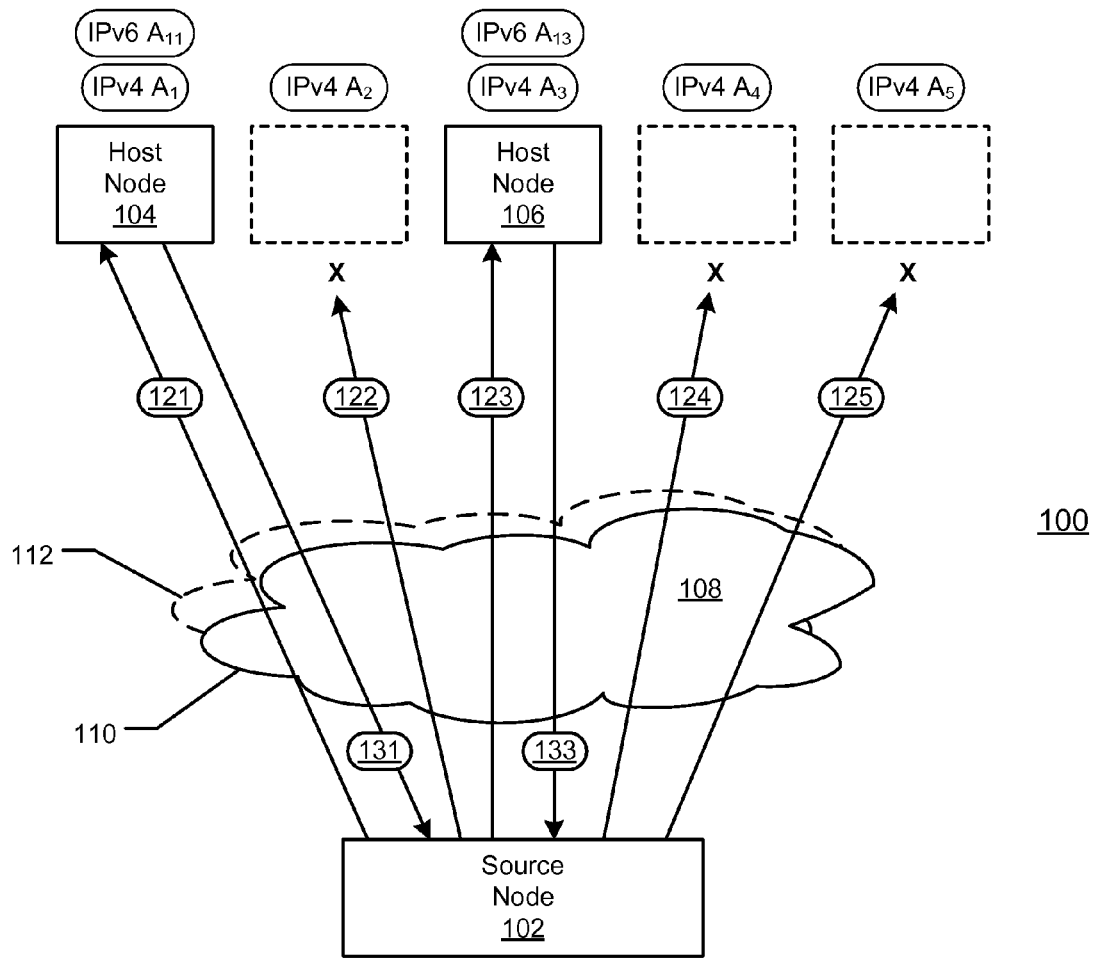
FIG. 1 illustrates a block diagram of a networked system utilizing host discovery across different network address spaces according to one aspect of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer (e.g., a desktop computer or a notebook computer), a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

FIGS. 1-6 illustrate example techniques for host discovery in a networked system having two or more network address spaces. The evolution of network protocols can result in a change in network address formats, such as a change from the 32-bit network address specified by Internet Protocol version 4 (IPv4) to the 128-bit network address specified by IP version 6 (IPv6). However, a full transition from one network address format to another network address format typically is not instantaneously achieved in most networks. Rather, there may be a significant transition period whereby both network address formats may be implemented and thus any particular node in a network can be addressed by either the old network addressing or the newer network addressing, a capability which often is referred to as "dual stack." The disclosed techniques take advantage of this "dual stack" capability in a network supporting two or more address spaces to perform host discovery in the network address space of one network address format using the network address space of another network format (e.g., via a PING sweep in the network address space of the other network format). Typically, the host discovery is performed using addressing in a smaller network address space (e.g., IPv4 network address format) to discover hosts in a larger network address space (e.g., IPv6 network address format). However, the converse implementation also can be employed without departing from the scope of the present disclosure.

For ease of description, the techniques of the present disclosure are described in the example context of host discovery of IPv6 network addresses of host nodes using the IPv4 address space. However, these techniques are not limited to these network address formats. Rather, these techniques can be employed for host discovery in any number of "dual stack" network configurations without departing from the scope of the present disclosure. To illustrate, using the guidelines provided herein, these techniques can be utilized to discover hosts in an Asynchronous Transfer Mode (ATM) address space utilizing an IP address space, or vice versa.

FIG. 1 illustrates a networked system 100 utilizing host discovery across network address spaces in accordance with at least one embodiment of the present disclosure. In the depicted example, the networked system 100 includes a plurality of nodes (e.g., nodes 102, 104, and 106) coupled via a network 108 that supports two or more network address formats (e.g., both the IPv4 and the IPv6 network address formats). For purposes of illustration, a cloud 110 having a solid outline represents the network address space of the network 108 in which the host discovery process is carried out (IPv4 in this example) and a cloud 112 having a dashed outline represents the network address space of the network 108 which the hosts also support (IPv6 in this example) in accordance with dual stack requirements in the networked system 100.

The nodes 102, 104, and 106 can include any of a variety of networked information handling systems, such as personal computers, notebook computers, networked portable devices (e.g., cell phones, PDAs), servers, routers, switches, etc. An example implementation of a node as an information handling system is described below with reference to FIG. 6. Each of the nodes 102, 104, and 106 is dual stack configured and thus is addressable via either or both of a corresponding IPv4 address and a corresponding IPv6 address. For the illustrated example, the node 102 performs host discovery to discover the other nodes 104 and 106 in the network 108 and thus the node 102 is referred to herein as "source node 102" and the nodes 104 and 106 are referred to herein as "host node 104" and "host node 106", respectively. The nodes 104 and 106 likewise can conduct host discovery in the network 108 as described herein.

The source node 102 is configured to perform a host discovery process in order to identify the IPv6 addresses of host nodes on the network 108. However, as the host address fields in IPv6 can be 96 bits or more, conventional host discovery techniques such as a PING sweep of the IPv6 host address space can be infeasible due to the sheer number of PING operations it would take to cover an address space of that scope. Accordingly, in at least one embodiment, the source node 102 takes advantage of the fact that each host node in the network 108 also has an IPv4 address in addition to a corresponding IPv6 address due to the dual stack requirement of the network 108 to perform a host discovery process in the IPv4 address space to identify the hosts in the network 108 and, so identified, to obtain not only their IPv4 addresses but also their IPv6 addresses.

To initiate this host discovery process, the source node 102 generates and transmits a host discovery request message to each IPv4 network address within a specified address range (e.g., within an 8 bit or 16 bit host address field). In one embodiment, this transmission can include transmission of a single host discovery request message to a multicast or broadcast IPv4 address, which is then handled by the network 108 to deliver the multicast/broadcast host discovery request message to every member of the multicast or broadcast group. Alternately, the source node 102 can transmit a separate host discovery request message to each IPv4 address within the specified address range, either in sequence or in parallel. To illustrate, assume that the specified address range has five IPv4 addresses $A_1$-$A_4$. In this case, to sweep this address range, the source node 102 can transmit a host discovery request message 121 to IPv4 address $A_1$, transmit a host discovery request message 122 to IPv4 address $A_2$, transmit a host discovery request message 123 to IPv4 address $A_3$, transmit a host discovery request message 124 to IPv4 address $A_4$, and transmit a host discovery request message 115 to IPv4 address $A_5$. As described in greater detail with reference to FIG. 2, the host discovery request message utilized by the source node 102 can be implemented as an Internet Control Message Protocol (ICMP) ECHO request packet. Accordingly, the sweep of the specified IPv4 address range can be performed via, e.g., a PING sweep of the specified IPv4 address range.

Each host node accessible via an IPv4 address in the network 108 in turn is configured to respond to a host discovery request message from the source node 102 with a host discovery reply message that includes not only the IPv4 address of the host node but also the IPv6 address (or multiple IPv6 addresses) associated with the host node. The host node 104, being addressable via IPv4 address $A_1$ and IPv6 address $A_{11}$, responds to the host discovery request message 121 received via IPv4 address $A_1$ by generating a host discovery reply message 131 containing information representative of the IPv6 address $A_{11}$ and then transmitting the host discovery reply message 131 to the source node 102. Likewise, the host node 106, being addressable via the IPv4 address $A_3$ and the IPv6 address $A_{13}$, responds to the host discovery request message 123 received via IPv4 address $A_3$ by generating a host discovery reply message 133 containing information representative of the IPv6 address $A_{13}$ and then transmitting the host discovery reply message 133 to the source node 102. The information representative of the IPv6 address can include the full IPv6 address value, a portion of the IPv6 address value (e.g., the portion of the IPv6 address value that falls within the host addressable field), an encrypted version of the IPv6 address, and the like. As described in greater detail below, the host nodes in the network 108 are configured to utilize a modified ICPM ECHO reply packet as the host discovery reply message to convey In the illustrated example, no host nodes are associated with IPv4 addresses $A_2$, $A_4$, and $A_5$ (as illustrated by the boxes with dashed outlines). Thus the source node 102 determines that no hosts reside at IPv4 addresses $A_2$, $A_4$, and $A_5$ when no reply is given to the host discovery request messages 122, 124, and 125 within a specified duration (e.g., within a specified ECHO timer lapse).

The source node 102 receives each host discovery reply message and extracts from the host discovery reply message the information representing the IPv6 address of the host node that transmitted the host discovery reply message. The extracted IPv6 address information then can be stored in a datastore (e.g., a memory, a hard disk, a cache, a database, a register file, etc.) associated with the source node 102. The source node 102 subsequently can use the IPv6 addresses obtained from the host discovery process to route information and other signaling to the other nodes on the network 108 via their IPv6 addresses, rather than having to rely only on their IPv4 addresses.

Figure 2:
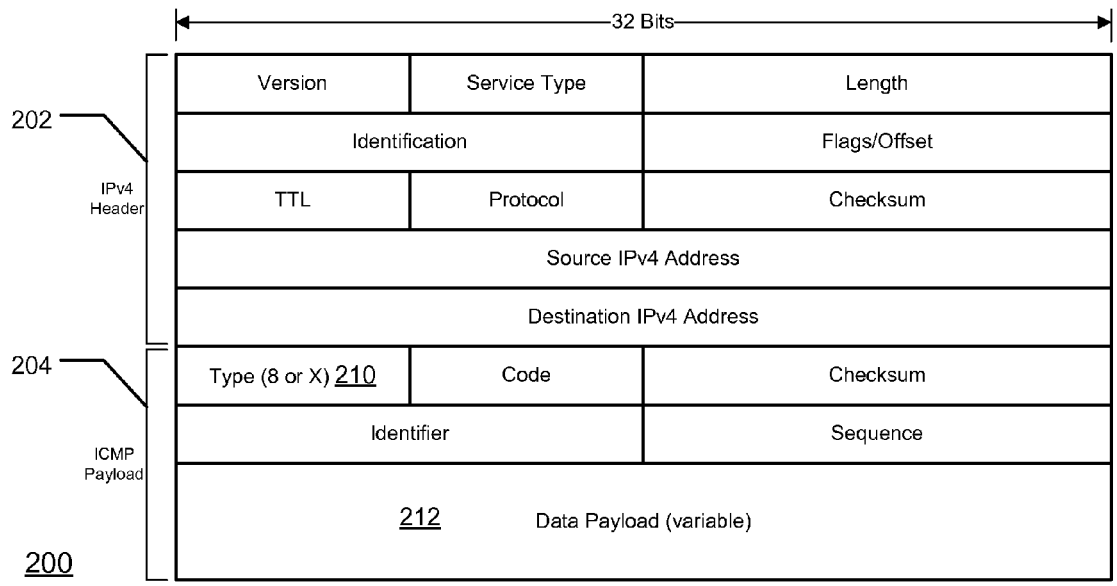
FIG. 2 illustrates a diagram of an Internet Control Message Protocol (ICMP) ECHO request packet used as a host discovery request message according to one aspect of the present disclosure.

FIG. 2 illustrates a conventional ICMP ECHO request packet 200 that can be employed by the source node 102 of the networked system 100 of FIG. 1 as a host discovery request message in accordance with at least one embodiment of the present disclosure. As shown, the ICMP ECHO request packet 200 includes an IPv4 header portion 202 and an ICMP payload portion 204. Among other fields, the IPv4 header 202 includes a source IPv4 address 208 to store at least a portion of the IPv4 address of the source node 102 and a destination IPv4 address to store at least a portion of the IPv4 address of the destination node (i.e., the host to be discovered). The network 108 (FIG. 1) utilizes the destination IPv4 address to route the ICMP ECHO request packet 200 to the corresponding host node (if any) at the destination IPv4 address.

The ICMP payload portion 204 includes, among other fields, a type field 210 and a data payload field 212. Conventionally, an ICMP ECHO request packet employed in a PING process has a value of 8 in the type field 210. Accordingly, to distinguish the ICMP ECHO request packet 200 (as used for IPv6 address discovery) from conventional ICMP echo request packets, the ICMP ECHO request packet 200 can include a specified value other than 8 in the type field 210. Alternately, a specified value can be stored in the data payload field 212 to identify the ICMP ECHO request packet 200 as a host discovery request message for host discovery across multiple address spaces. Further, in one embodiment, rather than utilizing a modified ICMP ECHO request packet, a conventional ICMP ECHO request packet can be utilized as a host discovery request message and the receiving host node can be configured to automatically respond to any ICMP ECHO request packet with a host discovery reply message containing the IPv6 address information of the receiving host node.

Figure 3:
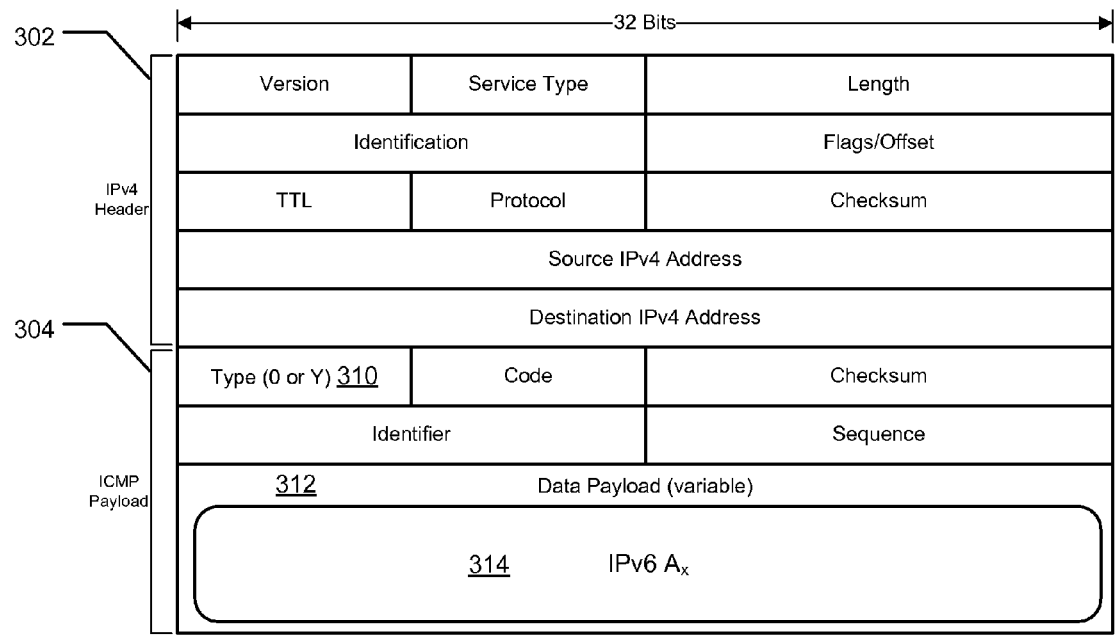
FIG. 3 illustrates a diagram of an Internet Control Message Protocol (ICMP) ECHO reply packet used as a host discovery reply message according to one aspect of the present disclosure.

FIG. 3 illustrates a conventional ICMP ECHO reply packet 300 that can be employed by a host node (e.g., host nodes 104 and 106) of the networked system 100 of FIG. 1 as a host discovery reply message in accordance with at least one embodiment of the present disclosure. As shown, the ICMP ECHO reply packet 300 includes an IPv4 header portion 302 and an ICMP payload portion 304. The ICMP payload portion 304 includes, among other fields, a type field 310 and a data payload field 312. An ICMP ECHO reply packet conventionally employed in a PING process has a value of 0 in the type field 310. To distinguish the ICMP ECHO reply packet 300 (as used for IPv6 address discovery) from conventional ICMP echo reply packets, the ICMP ECHO reply packet 300 can include a specified value other than 0 in the type field 310 or another specified value can be stored in the data payload field 312 to identify the ICMP ECHO reply packet 300 as a host discovery reply message for host discovery across multiple address spaces. As noted above, the host node responds to a host discovery request message by transmitting back a host discovery reply message containing information representative of the IPv6 address of the host node. In one embodiment, this information is stored as IPv6 address data 314 in the data payload field 312 of the ICMP ECHO reply packet 300.

Figure 4:
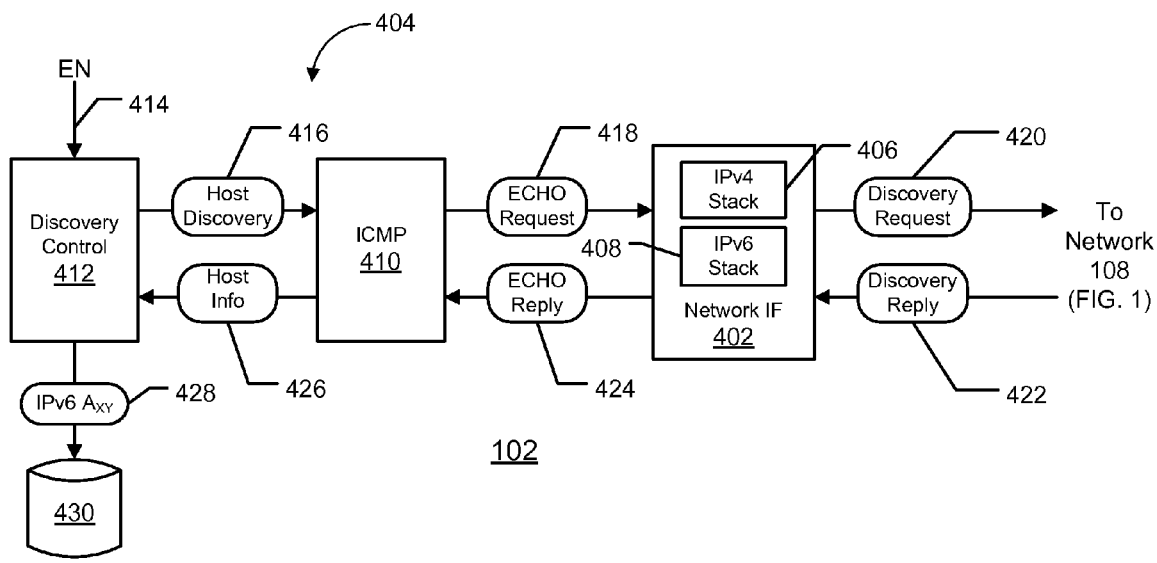
FIG. 4 illustrates a diagram of a source node of the networked system of FIG. 1 according to one aspect of the present disclosure.

FIG. 4 illustrates an implementation of the source node 102 for host discovery in accordance with at least one embodiment of the present disclosure. In the illustrated implementation, the source node 102 includes a network interface 402 coupled to the network 108 and a host discovery agent 404. The network interface 402 includes an IPv4 stack 406 and an IPv6 stack 408. The host discovery agent 404 includes an ICMP agent 410 and a discovery control module 412. The host discovery agent 404 can be implemented as, for example, a software program of executable instructions executed by one or more processors (not shown) of the source node 102 to perform the functions described herein. Further, the ICMP agent 410 can be implemented in one or both of the network stacks 406 and 408 or the ICMP agent 410 can be implemented as a separate software program executed by one or more processors, as a hardware component, or a combination thereof.

In operation, a user, application, or other component asserts an enable (EN) signal 414 to initiate the host discovery process. To illustrate, a user may initiate a PING sweep at the application level of the source node 102, which results in an assertion of the EN signal 414. In response, the discovery control module 412 provides a host discovery signal 416 to the ICMP agent 410. In response to the host discovery signal 416 the ICMP agent 410 generates either a single ICMP echo request packet 418 that is to be broadcast or multicast to IPv4 addresses of a specified address range, or the ICMP agent 410 generates a separate ICMP echo request packet 418 for each IPv4 address of the specified address range. The network interface 402 receives the ICMP ECHO request packet 418, encapsulates it with the IPv4 header portion 202 (FIG. 2), and transmits the result as a host discovery request message 420 for transmission by the network 108 to one or more IPv4 addresses.

If the destination IPv4 address of the host discovery request message 420 is associated with a networked host node, the host node replies with a host discovery reply message 422 that is transmitted back to the source node 102 via the network 108. The network interface 402 strips the IPv4 header portion 302 (FIG. 3) from the host discovery reply message 422 and provides the resulting ICMP ECHO reply packet 424 to the ICMP agent 410. The ICMP agent 410, in turn, extracts the data payload of the ICMP ECHO reply packet 424 and provides the data payload as host information 426 to the discovery control module 412. The discovery control module 412 processes the host information 426 to obtain the information representative of the IPv6 address of the host node and then provides the resulting IPv6 address information to a datastore 430 for storage and later use.

Figure 5:
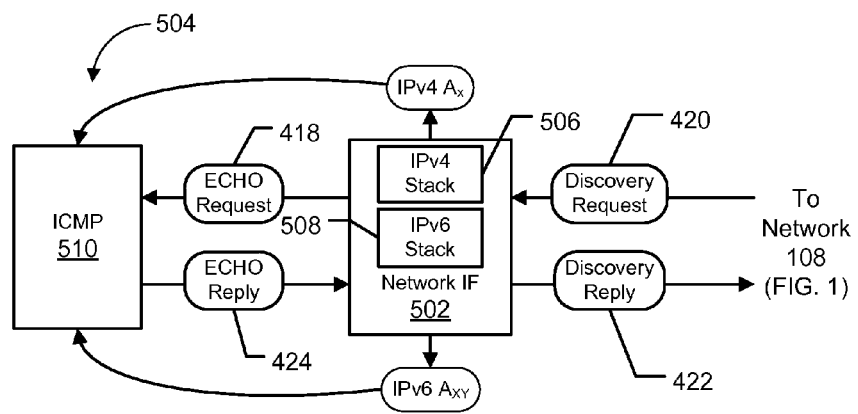
FIG. 5 illustrates a diagram of a host node of the networked system of FIG. 1 according to one aspect of the present disclosure.

FIG. 5 illustrates an implementation of a host node 500 (e.g., host node 104 or host node 106, FIG. 1) for host discovery in accordance with at least one embodiment of the present disclosure. In the illustrated implementation, the host node 500 includes a network interface 502 coupled to the network 108 and a discovery response agent 504. The network interface 502 includes an IPv4 stack 506 and an IPv6 stack 508. The discovery response agent 504, in this example, includes an adapted ICMP agent 510 implemented as, for example, a software program of executable instructions executed by one or more processors (not shown) of the host node 500 to perform the functions described herein. The ICMP agent 510 can be implemented in one or both of the network stacks 506 and 508 or the ICMP agent 510 can be implemented as a separate software program executed by one or more processors, as a hardware component, or a combination thereof.

In operation, the network interface 502 receives the host discovery request message 420 (FIG. 4) transmitted by the source node 102 to the IPv4 address $A_x$ of the host node 500. The IPv4 stack 506 strips the IPv4 header from the host discovery request message 420 and provides the resulting ICMP ECHO request packet 418 to the ICMP agent 510. The ICMP agent 510, in response to the ICMP ECHO request packet 418, determines the IPv6 address $A_{xy}$ of the host node 500 (e.g., as obtained from the IPv6 stack 508) and generates the ICMP ECHO reply packet 424 with information representative of the determined IPv6 address $A_{xy}$ in the data payload field 314 (FIG. 3) of the ICMP ECHO reply packet 424. The IPv4 stack 506 encapsulates the ICMP ECHO reply packet 424 with an IPv4 header to generate the host discovery reply message 422 and the network interface 502 then provides the host discovery reply message 422 to the network 108 for transmission to the source node 102 for processing as described above.

Figure 6:
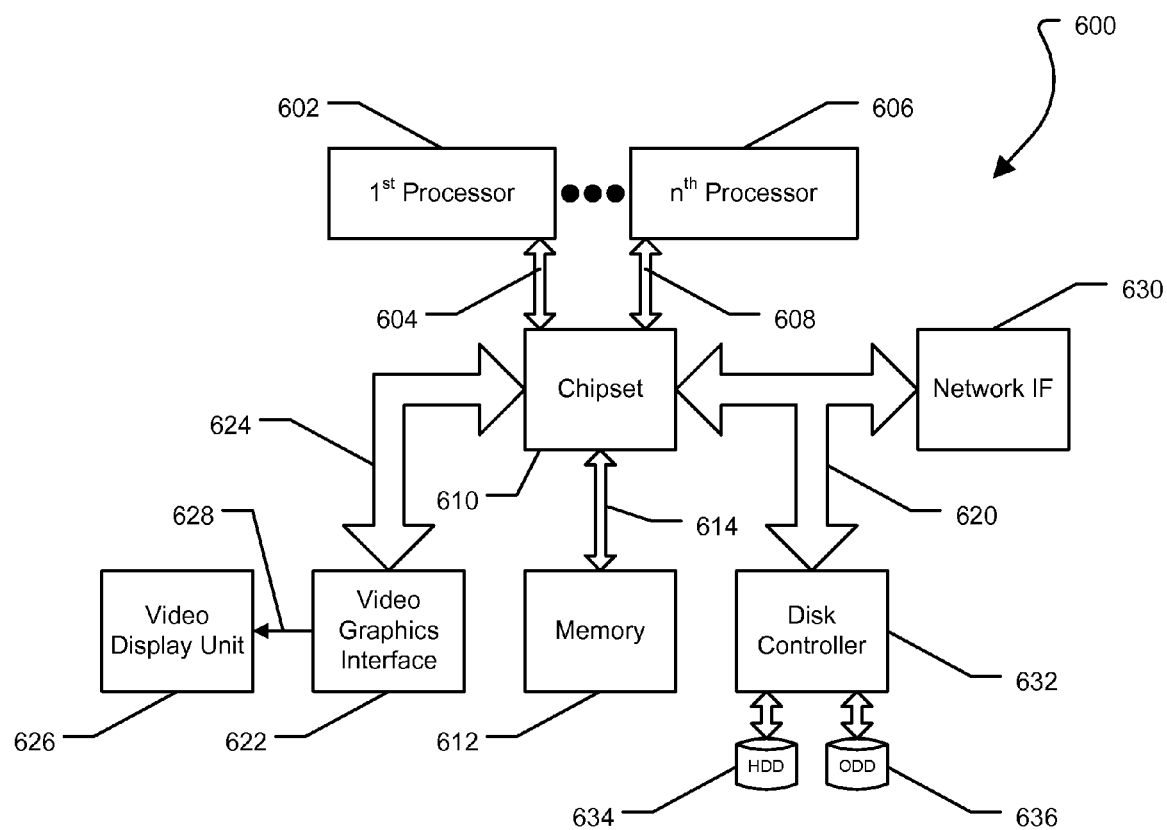
FIG. 6 illustrates a block diagram of an information handling system according to one aspect of the present disclosure.

FIG. 6 illustrates an example information handling system 600 in which the source node 102 of FIG. 4 or the host node 500 of FIG. 5 can be implemented in accordance with at least one embodiment of the present disclosure. In one form, the information handling system 600 can be a computer system such as a server. As shown in FIG. 6, the information handling system 600 can include a first physical processor 602 coupled to a first host bus 604 and can further include additional processors generally designated as $n^{th}$ physical processor 606 coupled to a second host bus 608. The first physical processor 602 can be coupled to a chipset 610 via the first host bus 604. Further, the $n^{th}$ physical processor 606 can be coupled to the chipset 610 via the second host bus 608. The chipset 610 can support multiple processors and can allow for simultaneous processing of multiple processors and support the exchange of information within information handling system 600 during multiple processing operations.

According to one aspect, the chipset 610 can be referred to as a memory hub or a memory controller. For example, the chipset 610 can include an Accelerated Hub Architecture (AHA) that uses a dedicated bus to transfer data between first physical processor 602 and the $n^{th}$ physical processor 606. For example, the chipset 610, including an AHA enabled-chipset, can include a memory controller hub and an input/output (I/O) controller hub. As a memory controller hub, the chipset 610 can function to provide access to first physical processor 602 using first bus 604 and $n^{th}$ physical processor 606 using the second host bus 608. The chipset 610 can also provide a memory interface for accessing memory 612 using a memory bus 614. In a particular embodiment, the buses 604, 608, and 614 can be individual buses or part of the same bus. The chipset 610 can also provide bus control and can handle transfers between the buses 604, 608, and 614.

According to another aspect, the chipset 610 can be generally considered an application specific chipset that provides connectivity to various buses, and integrates other system functions. For example, the chipset 610 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 610. The chipset 610 can also be packaged as an application specific integrated circuit (ASIC).

The information handling system 600 can also include a video graphics interface 622 that can be coupled to the chipset 610 using a third host bus 624. In one form, the video graphics interface 622 can be an Accelerated Graphics Port (AGP) interface to display content within a video display unit 626. Other graphics interfaces may also be used. The video graphics interface 622 can provide a video display output 628 to the video display unit 626. The video display unit 626 can include one or more types of video displays such as a flat panel display (FPD) or other type of display device.

The information handling system 600 can also include a network interface 630 (corresponding to either network interface 402 of FIG. 4 or network interface 502 of FIG. 5) that can be connected via an I/O bus 620 to the chipset 610 and connected to one or more networks, such as an intranet or the Internet. The I/O bus 620 can include an industry standard bus or proprietary bus and respective interface or controller. For example, the I/O bus 620 can also include a Peripheral Component Interconnect (PCI) bus or a high speed PCI-Express bus. In one embodiment, a PCI bus can be operated at approximately 66 MHz and a PCI-Express bus can be operated at approximately 628 MHz. PCI buses and PCI-Express buses can be provided to comply with industry standards for connecting and communicating between various PCI-enabled hardware devices. Other buses can also be provided in association with, or independent of, the I/O bus 620 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 610 can be a chipset employing a Northbridge/Southbridge chipset configuration (not illustrated). For example, a Northbridge portion of the chipset 610 can communicate with the first physical processor 602 and can control interaction with the memory 612, the I/O bus 620 that can be operable as a PCI bus, and activities for the video graphics interface 622. The Northbridge portion can also communicate with the first physical processor 602 using first bus 604 and the second bus 608 coupled to the $n^{th}$ physical processor 606. The chipset 610 can also include a Southbridge portion (not illustrated) of the chipset 610 and can handle I/O functions of the chipset 610. The Southbridge portion can manage the basic forms of I/O such as Universal Serial Bus (USB), serial I/O, audio outputs, Integrated Drive Electronics (IDE), and ISA I/O for the information handling system 600.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
providing, at a first node, a request message for transmission via a network to a second node, the transmission performed exclusively using a first network address format, the request message identifying the second node using a first network address compliant with the first network address format, the request message comprising an Internet Control Message Protocol (ICMP) header, a type parameter therein identifying the request message as a host discovery request message, the type parameter having a value heretofore not allocated by the ICMP;

receiving, at the first node, a host discovery reply message from the second node responsive to the host discovery request message, the host discovery reply message having the first network address format and including information representative of a second network address of the second node, the second network address having a second network address format different than the first network address format;

extracting the information representative of the second network address from the host discovery reply message; and storing the information representative of the second network address at a datastore associated with the first node.

2. The method of claim 1, wherein the first network address format is associated with a first address space and the second network address format is associated with a second address space larger than the first address space.

3. The method of claim 1, wherein the first network address format comprises an Internet Protocol version 4 (IPv4) network address format and the second network address format comprises an Internet Protocol version 6 (IPv6) network address format.

4. The method of claim 1, further comprising:
generating, at the second node, the host discovery reply message responsive to receiving the host discovery request message; and
transmitting, via the network, the host discovery reply message from the second node to a network address of the first node, the network address having the first network address format.

5. The method of claim 1, further comprising:
transmitting, via the network, a message from the first node to the second node using the second network address.

6. The method of claim 1, wherein:
the type parameter has a value greater than decimal eighteen; and
the host discovery reply message comprises an ICMP message, a data payload therein containing the information representative of the second network address.

7. The method of claim 1, wherein transmitting the host discovery request message comprises transmitting the host discovery request message as part of a sweep of a specified address range of the network, the specified address range having the first network address format.

8. A method comprising:
receiving, at a second node, a request message transmitted from a first node via a network, the transmission performed exclusively using a first network address format, the request message identifying the second node using a first network address compliant with the first network address format, the second node configured to recognize the first network address, and wherein the request message comprises an Internet Control Message Protocol (ICMP) header, a type parameter therein identifying the request message as a host discovery request message, the type parameter having a value heretofore not allocated by the ICMP;
generating, at the second node, a host discovery reply message responsive to receiving the host discovery request message, the host discovery reply message having the first network address format and including information representative of the second network address of the second node, the second network address having a second network address format different than the first network address format; and
transmitting, via the network, the host discovery reply message from the second node to a network address of the first node, the transmission performed exclusively using the first network address format.

9. The method of claim 8, wherein the first network address format is associated with a first address space and the second network address format is associated with a second address space larger than the first address space.

10. The method of claim 8, wherein the first network address format comprises an Internet Protocol version 4 (IPv4) network address format and the second network address format comprises an Internet Protocol version 6 (IPv6) network address format.

11. The method of claim 8, wherein:
the type parameter has a value greater than decimal eighteen; and
the host discovery reply message comprises an ICMP message, a data payload therein containing the information representative of the second network address.

12. A first information handling system comprising:
a network interface adapted to couple to a network having a first network address format; and
a host discovery agent coupled to the network interface, the host discovery agent configured to:
provide a request message to the network interface for transmission to a first network address, the first network address associated with a second information handling system, the first network address having the first network address format that is used throughout the transmission, and wherein the request message comprises an Internet Control Message Protocol (ICMP) header, a type parameter therein identifying the request message as a host discovery request message;
receive from the network interface a host discovery reply message from the second information handling system responsive to the host discovery request message, the host discovery reply message having the first network address format and including information representative of a second network address of the second information handling system, the second network address having a second network address format different than the first network address format; and
store the information representative of the second network address at a datastore of the first information handling system.

13. The first information handling system of claim 12, wherein the first network address format is associated with a first address space and the second network address format is associated with a second address space larger than the first address space.

14. The first information handling system of claim 12, wherein the first network address format comprises an Internet Protocol version 4 (IPv4) network address format and the second network address format comprises an Internet Protocol version 6 (IPv6) network address format.

15. The first information handling system of claim 12, further comprising:
at least one processor; and
wherein the host discovery agent comprises a set of executable instructions stored in a memory and executable by the at least one processor.

16. The first information handling system of claim 12, wherein:

the type parameter has a value greater than decimal eighteen; and the host discovery reply message comprises an ICMP message, a data payload therein containing the information representative of the second network address.

17. The first information handling system of claim 12, wherein the host discovery agent is configured to transmit the host discovery request message as part of a sweep of a specified address range of the network, the specified address range having the first network address format.

18. A first information handling system comprising:
a network interface adapted to couple to a network; and
a host discovery agent coupled to the network interface, the host discovery agent configured to:
   receive from the network interface a request message transmitted from a second information handling system, the transmission performed exclusively using a first network address format, the request message identifying the first information handling system using a first network address compliant with the first network address format, and wherein the request message comprises an Internet Control Message Protocol (ICMP) header, a type parameter therein identifying the request message as a host discovery request message;
   generate a host discovery reply message responsive to receiving the host discovery request message, the host discovery reply message having the first network address format and including information representative of a second network address of the first information handling system, the second network address having a second network address format different than the first network address format; and
   provide the host discovery reply message to the network interface for transmission to a network address of the second information handling system, the network address having the first network address format.

19. The first information handling system of claim 18, wherein the first network address format is associated with a first address space and the second network address format is associated with a second address space larger than the first address space.

20. The first information handling system of claim 18, wherein the first network address format comprises an Internet Protocol version 4 (IPv4) network address format and the second network address format comprises an Internet Protocol version 6 (IPv6) network address format.

21. The first information handling system of claim 18, further comprising:
at least one processor; and
wherein the host discovery agent comprises a set of executable instructions stored in a memory and executable by the at least one processor.

22. The first information handling system of claim 18, wherein:
the type parameter has a value greater than decimal eighteen; and
the host discovery reply message comprises an ICMP ECHO message, a data payload therein containing the information representative of the second network address.

* * * * *